Dec. 22, 1964  A. W. HUGHES  3,161,910
SAUSAGE STUFFING MACHINE
Filed Nov. 2, 1962  2 Sheets-Sheet 2
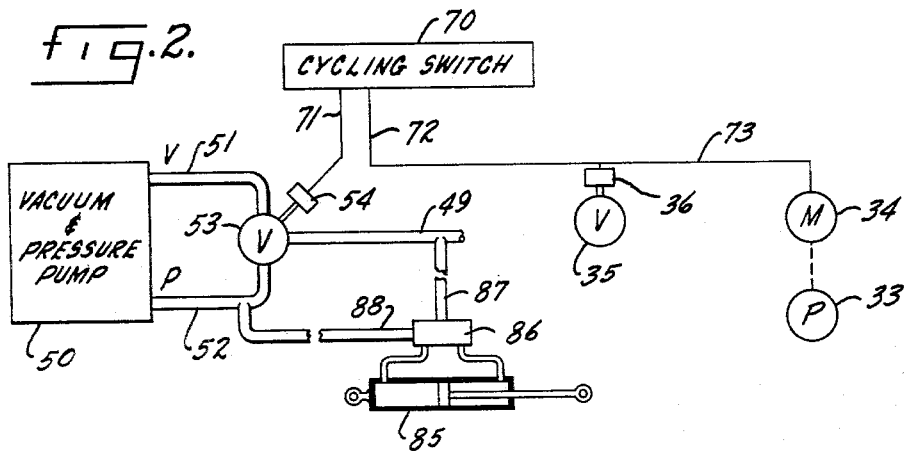
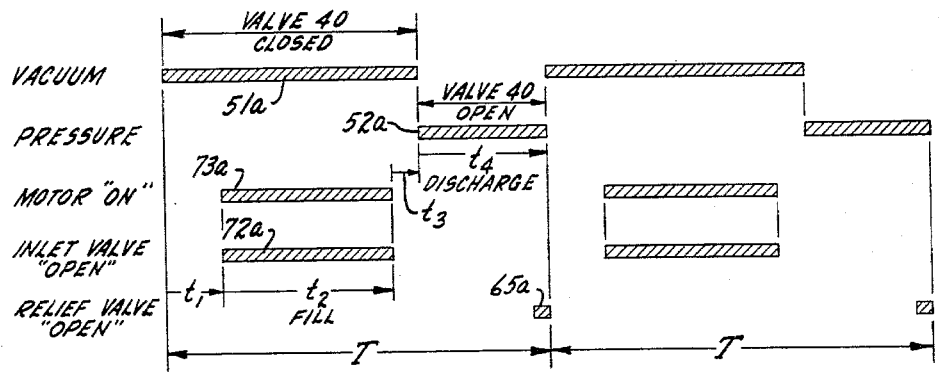
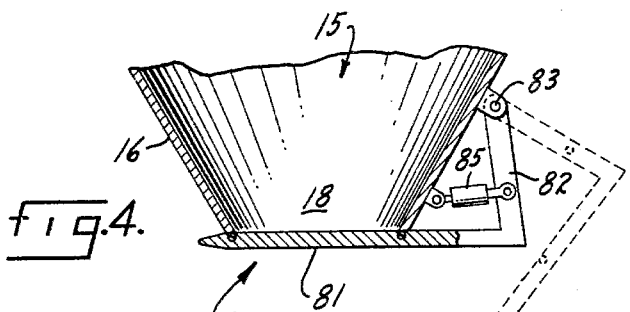
INVENTOR.
Alvin W. Hughes,
BY
Wolfe, Hubbard, Voit & Osann
Attorneys.

United States Patent Office 3,161,910
Patented Dec. 22, 1964

3,161,910
SAUSAGE STUFFING MACHINE
Alvin W. Hughes, 4N194 Church Road, Bensenville, Ill.
Filed Nov. 2, 1962, Ser. No. 235,001
8 Claims. (Cl. 17—39)

The present invention relates to sausage stuffing machines and particularly to means for deaerating and transporting the sausage batter prior to discharge into the casing.

It is an object of the present invention to provide a sausage stuffing machine with a means for prompt and efficient removal of entrained air from the sausage batter flowing from a sausage chopper or emulsifier. It is another object of the invention to provide means for deaerating sausage batter or the like at a rate of flow which is greater than that which can be accommodated by prior machines of approximately the same physical size. It is still another object of the present invention to provide a deaerating and pressurizing machine for sausage batter which is simple and inexpensive to construct, which requires little or no maintenance and which is easily cleaned.

Other objects and advantages of the invention will become apparent upon reading the attached detailed description and upon reference to the drawings in which:

FIG. 2 shows a control circuit for use with the device of FIG. 1.

FIG. 3 is a sequence diagram showing the timing of the operations occurring during typical vacuum-pressure cycle.

FIG. 4 is a fragmentary setcion showing an alternate form of check valve.

Figure 1:
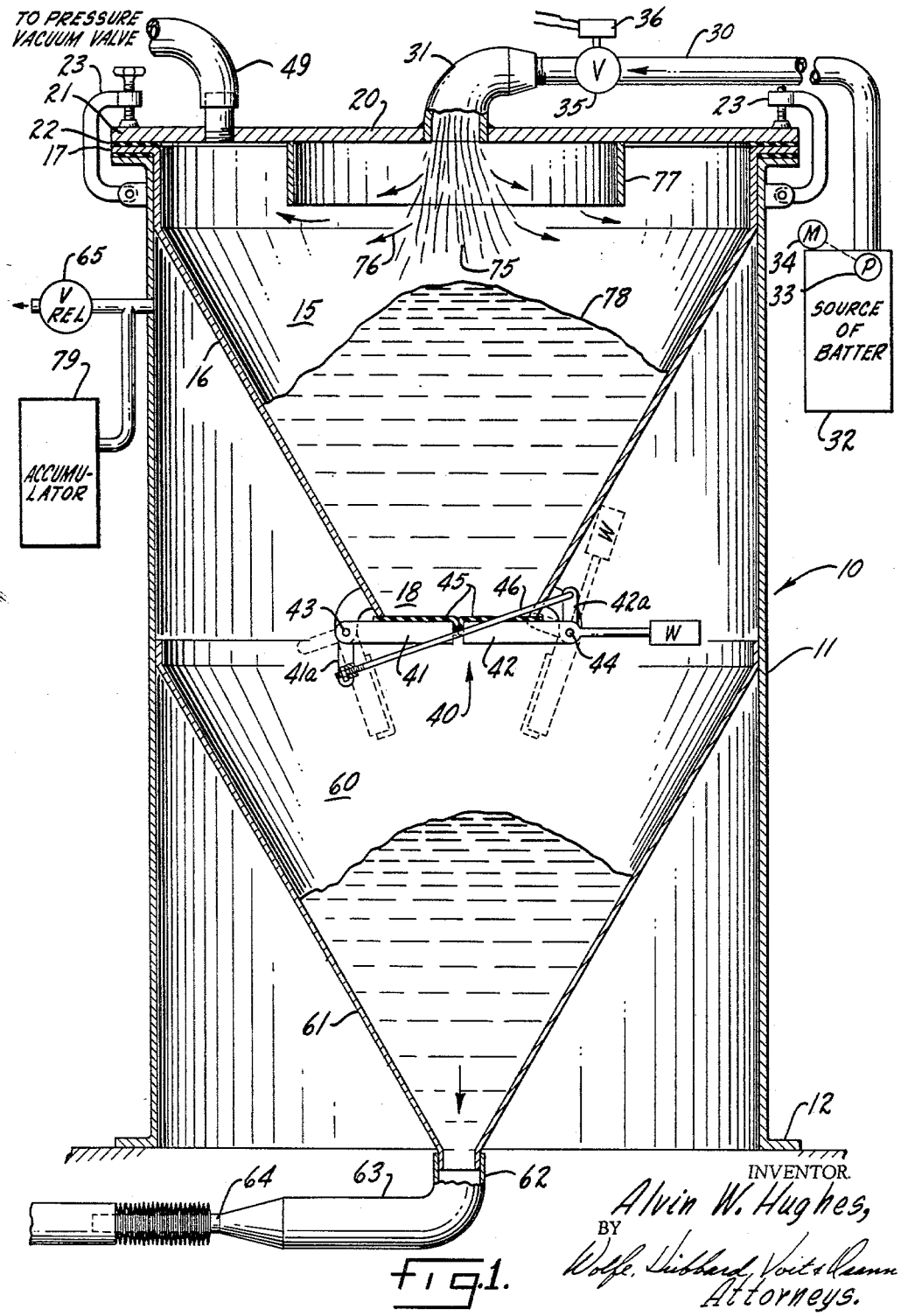
FIGURE 1 is a vertical section of deaerating pressurizing device constructed in accordance with the present invention.

While the invention has been described in connection with a preferred embodiment, it will be understood that there is no intention to limit the invention to the embodiment shown but I intend to cover the various alternative and equivalent construction falling within the spirit and scope of the appended claims.

Turning now to the drawings there is disclosed in FIG. 1 a deaerating and pressurizing apparatus 10 having a frame or enclosure 11 which may, for example, be of cylindrical shape having a mounting base 12. Within the upper portion of the device a vacuum treating chamber 15 is provided which, in the preferred form of the invention is defined by a funnel shaped wall 16 having a mounting flange 17 at its upper end and an opening 18 at its lower end. For enclosing the vacuum treating chamber, a cover plate 20 is employed which is preferably of disc shape having a peripheral flange 21 which is seated on the flange 17 and separated therefrom by a layer of packing 22. To secure the cover plate 20 in place, it may be clamped by any suitable means, for example a plurality of clamps 23.

For the purpose of conducting a stream of batter to the device, a conduit 30 is provided having a coupling 31 connected to the cover plate 20. The batter flows from a source 32 which may, for example, be an emulsifier, including a pump 33 driven by a motor 34. In order to maintain vacuum within chamber 15 prior to discharge of batter from source 32 and to insure positive cut-off of the flow of batter through the conduit I have preferably provided, relatively close to the fitting 31, a valve 35 which is electrically operated by a solenoid 36.

To seal the lower end of the chamber 15 and to provide periodic discharge of the batter, a valve 40 is used. In the preferred embodiment the valve 40 is a check valve of the self-operating type capable of closing and sealing automatically when a vacuum is applied to the chamber 15 and capable of opening fully when air is admitted to the chamber under pressure. Thus, in the present instance the valve is in the form of a trapdoor having first and second valve members 41, 42 suitably hinged at 43, 44 and resiliently surfaced as indicated at 45 to enable an airtight seal with the lower lip of the wall 16 defining the chamber. In order to insure that the valve members 41, 42 operate in unison, the members are provided with arms 41a, 42a interconnected by a link 46. A weight W serves to bias the valve members toward the closed position.

In carrying out the invention means are provided for cyclically applying vacuum and air pressure to the chamber 15. For this purpose an air line 49 is connected to the upper end of the chamber 15, for example, to the cover plate 20 as shown, and coupled to a suitable vacuum and pressure source 50 (see FIG. 2) having a vacuum line 51 and pressure line 52. Devices capable of applying both vacuum and pressure are well known in the art and may, for example, consist of a suitable air pump with the vacuum being pulled at the pump inlet and having pressure and vacuum reservoirs. For switching between the lines 51, 52, a selector valve 53 is used which is preferably of the electrical type operated by a solenoid 54.

For the purpose of receiving the accumulated batter from the chamber 15, a receptacle 60 is provided below the chamber having a wall 61 which is preferably of funnel shape and having an outlet 62 at its lower end connected to an outlet conduit 63 terminating in a discharge nozzle 64. It will be understood that the discharge nozzle is of a well known type suitable for discharging the sausage batter into a pleated and compacted sausage casing. In practicing the invention the receptacle 60 is sealed with respect to the atmosphere and its only communication is that which occurs through the valve 40 previously mentioned. Means are, however, provided for insuring that the pressure existing within the receptacle 60 is kept below a predetermined value which is preferably somewhat less than the pressure achieved in the chamber 15. For this purpose a relief valve 65 is provided. For example, when the pressure available at the pressure line 52 is 135 lbs. per square inch, the relief valve 65 may be set for 125 lbs. per square inch. During the vacuum portion of the cycle, an absolute pressure on the order of 16 inches of mercury is preferred.

For the purpose of controlling the inlet and discharge cycle of the chamber 15, a cycling switch mechanism 70 is employed having a first control line 71 for operating the solenoid 54 connected to the selector valve 53 and a second control line 72 for operating the solenoid 36 connected to the valve 35. If desired, the control line may be extended as at 73, or a separate control line may be provided, to operate the motor 34 driving the pump 33 so that the pump is operated when, and only when, the inlet valve 35 is opened. The construction of the cycling switch 70 does not per se constitute part of the present invention and many different types of switches may be employed to produce the desired cycling schedule. Such schedule has been set forth in FIG. 3 which indicates the "on" times and operating sequence of the various portions of the device during a typical cyclical period T.

Starting at the beginning of the cycle, vacuum is applied within the chamber 15 as indicated at 51a. Application of the vacuum immediately causes the valve 40 to seal closed. After a short time interval $t_1$ the motor driving the pump is turned on as indicated at 73a and the inlet valve is turned on as indicated at 72a, and the vacuum is built up to the desired level. Because of the positive pressure provided by the pump 33 and the suck of vacuum within the chamber, batter is drawn through the conduit 30 and discharged at the top of the chamber as a stream 75. As the stream 75 enters the vacuum, the air entrained therein, and which is normally present because of the action of the sausage chopper, rapidly escapes as indicated by the arrows 76. Since the expansion of the air tends to break up the solid stream and results in lateral splattering of the batter, I preferably provide, surrounding the inlet, a cylindrical barrier 77 which may be secured to the cover plate 20 in any desired way. The batter, with the air removed from it accumulates at the bottom of the chamber to form a mass 78.

When the accumulation has been built up to the desired level corresponding to the expiration of a predetermined time interval indicated at $t_2$ in FIG. 3, the pump is stopped and the inlet valve 35 is closed by the control line 72. At the end of an additional time interval indicated at $t_3$ in FIG. 3, the selector valve is operated by the control line 71 so that pressure, instead of vacuum is applied to the line 49. The first effect of the pressure is to cause immediate and complete opening of the check valve 40 so that the charge of batter contained therein is discharged into the receptacle 60 positioned below. The pressure is applied over a time interval $t_4$ which is sufficiently long as to insure complete discharge of the batter followed by the flow of pressurized air from the chamber to the receptacle. As the air pressure tends to build up in the receptacle 60, the relief valve 65 is operated as indicated at 65a thereby limiting the maximum pressure. Because of the pressure in the receptacle, the batter flows out of the discharge opening 62 to the discharge nozzle 64 where it is utilized.

As a new cycle begins, the valve 53 in FIG. 2 is again operated to apply vacuum to the line 49 closing the valve 40, and the valve 35 and associated pump 33 in the supply conduit are again turned on following the $t_1$, time interval. The resulting incoming stream of batter is deaerated just as described above. It should be noted that during the vacuum portion of the cycle, i.e. during the time that the valve 40 is closed, positive pressure continues to be maintained in the receptacle 60 so that batter continues to be discharged in a constant stream, free of any interruptions, from the discharge nozzle 64. The total volume of the receptacle 60, including the space which surrounds the chamber 15, is quite large, as shown, thereby providing a sufficient volume of compressed air acting upon the material in the receptacle so that the pressure is maintained substantially constant to provide a constant rate of discharge. However, if desired, an auxiliary accumulator or air tank 79, may be employed.

It will be found that the device is highly efficient, producing a stream of deaerated batter, free of bubbles, in spite of the fact that the batter supplied through the inlet conduit 30 may have a high percentage of air. The device, although of limited size, is capable of supplying batter at a high rate. Thus a unit constructed as shown, having a total volume on the order of 42 cubic feet and working at practical pressures on the order of 135 lbs. per sq. in. is capable of producing batter at the nozzle 64 at the rate of 3000 lbs. or more per hour. The device is positive and consistent in operation yet simple and inexpensive to construct. Since only a single chamber and a single reservoir are employed, the device is more cheaply manufactured, simpler and more reliable in operation, and easier to clean than the conventional three-chamber units previously used. All of the inner surfaces may be exposed for cleaning simply by releasing the clamps 23 which may be done in a few minutes time.

While the valve 40 between the chamber 15 and receptacle 60 is shown in FIG. 1 as automatically self-operated in response to pressure differential, it will be apparent to one skilled in the art that the invention is not limited to self-operating valves and hence the term "check valve" will be understood to include both self-operated and powered varities.

Thus, referring to FIG. 4 there is shown a power operated valve 80 having a valve member 81 for normally closing the lower end of the chamber 15. The valve member is secured to the end of an arm 82 which is hinged as indicated at 83 to the side wall 16 of the chamber for combined lateral and downward swinging movement. For the purpose of maintaining the valve normally closed and for opening the valve when pressure is applied in the chamber 15, I provide a pneumatic actuator 85 (see also FIG. 2) having a pilot valve 86. Control pressure is applied to the pilot valve via a control line 87 which is connected, as shown, to the air line 49 which communicates with the chamber 15. In addition to the control line 87, the pilot valve is fed by a supply line 88 which is connected to the pressure line 52. While the operation of the actuator and pilot valve will be apparent to one skilled in the art, it may be summarized briefly as follows:

Under normal conditions, i.e. during the time that a vacuum is applied in the air line 49, the pilot 86 causes pressure from the line 88 to be applied to the righthand end of the actuator 85 so that the valve is positively held in closed position. When air line 49 is pressurized, the pressure in the control line causes air pressure to be switched to the lefthand end of the actuator to produce an outward thrust causing the valve member 81 to swing to the open position as shown dotted in FIG. 4 and clear of the opening 18 of the chamber. At the end of the pressure portion of the cycle the valve is forcibly closed. Because of the construction and mounting of the valve member, it tends to "wipe" into fully seated position in spite of the presence of batter at the sealing surfaces.

Also, while the present invention has particular application to a sausage stuffing machine, it will be apparent that the invention is not necessarily limited thereto and is usable wherever it is desired to deaerate and transport a fluid, or semi-fluid material. Moreover, while an associated hollow receptacle 60 is used in the preferred embodiment, the invention in certain of its aspects, is not limited to use with a special receptacle, and it will be apparent to one skilled in the art that other receiving means may be used.

The invention has been described in connection with a chamber and receptacle which are funnel-shaped in order to facilitate downward flow. However, it will be understood that the invention is not limited to the funnel shape but the invention could be utilized with other specific hopper shapes and with discharge at the respective bottom portions of the chamber and receptacle. Moreover, while the receptacle 60 is, in the preferred embodiment, "below" the hopper, it need not be centered below it, the only requirement being that the receptacle is such as to cooperate with, and receive material from, a valve which is located at the lower end of the vacuum chamber. Finally, it will be understoood that the discharge nozzle 64 need not be of the form shown and that the term "nozzle" is intended to cover any discharge means receiving material from the outlet at the bottom of the receptacle 60.

I claim as my invention:

1. In a vacuum-pressure apparatus for handling batter in a sausage stuffing machine or the like, the combination comprising an enclosed vacuum treating chamber having an inlet conduit at its upper end, a pump connected to said conduit for forcing batter therethrough, an inlet valve interposed in said conduit, a receptacle below said chamber having an outlet at its lower end terminating in a discharge nozzle, a check valve interposed between the lower end of the chamber and the receptacle, control means for (a) substantially simultaneously operating said pump, opening said inlet valve, closing said check valve and applying vacuum to the chamber so that entrained air is removed from the batter as it flows into the chamber from said conduit and subsequently (b) turning off said pump, closing said inlet valve, opening said check valve and applying air pressure to said chamber for discharge of the contents of the chamber into said receptacle, means for cycling said control means so timed that the pressure portion of the cycle is initiated when the receptacle is partially filled, and means for maintaining pressure in said receptacle so that the batter deposited therein continues to flow to said discharge nozzle even during the vacuum portion of the cycle when the check valve is closed.

2. In a vacuum-pressure apparatus for handling batter in a sausage stuffing machine or the like, the combination comprising an enclosed vacuum treating chamber having an inlet conduit at its upper end connected to a source of pressurized batter, an enclosed receptacle below said chamber having an outlet at its lower end terminating in a discharge nozzle, a valve interposed between the chamber and the receptacle, means for pulling a vacuum in the chamber with the valve in closed position so that entrained air is removed from the batter as it flows into the chamber from said conduit, means for applying air pressure to said chamber and for opening said valve when the chamber has a charge of batter for discharge of the batter into the receptacle followed by flow of pressurized air into the receptacle, means for cycling the vacuum-applying and pressure-applying means, and means including an accumulator connected to the top portion of the receptacle for maintaining predetermined pressure in the receptacle for continued flow of batter from the receptacle to said nozzle even during the portion of the cycle when the valve is in closed position.

3. In a vacuum- pressure apparatus for handling batter in a sausage stuffing machine or the like, the combination comprising an enclosing vacuum treating chamber having an inlet conduit at its upper end connected to a source of batter under pressure, an inlet valve interposed in said conduit, a receptacle below said chamber having an outlet at its lower end terminating in a discharge nozzle, a check valve interposed between the chamber and the receptacle, control means for (a) substantially simultaneously opening said inlet valve, closing said check valve and applying a vacuum in said chamber so that entrained air is removed from the batter as it flows into the chamber from said conduit until said chamber having a charge of batter and for thereafter (b) substantially simultaneously closing said inlet valve, opening said check valve and applying air pressure to said chamber for discharge of the batter accumulated in the chamber into said receptacle followed by flow of pressurized air into said receptacle, means for cycling said control means so that the pressure-vacuum cycle is repeated, and means for controlling the air pressure in said receptacle so that the batter deposited therein flows continuously to said nozzle even when the check valve is in closed position.

4. In a vacuum-pressure apparatus for handling batter in a sausage stuffing machine or the like, the combination comprising an enclosed vacuum treating chamber having an inlet conduit at its upper end, a pump connected to said conduit for forcing batter therethrough, an inlet valve interposed in said conduit, a receptacle below said chamber having an outlet at its lower end terminating in a discharge nozzle, a check valve interposed between the lower end of the chamber and the receptacle, control means for (a) closing said check valve and applying vacuum to the chamber (b) operating said pump and opening said inlet valve so that entrained air is removed from the batter as it flows into the chamber from said conduit, (c) turning off said pump, (d) closing said inlet valve, (e) opening said check valve and applying air pressure to said chamber for discharge of the contents of the chamber into said receptacle, means for cycling said control means so timed that the pressure portion of the cycle is initiated when the receptacle is partially filled, and means for maintaining pressure in said receptacle so that the batter deposited therein continues to flow to said discharge nozzle even during the vacuum portion of the cycle when the check valve is closed.

5. In a vacuum-pressure apparatus for handling batter in a sausage stuffing machine or the like, the combination comprising an enclosed vacuum-pressure chamber having an inlet conduit at its upper end, a pump connected to said conduit for forcing batter therethrough, an inlet valve interposed in said conduit, a discharge valve associated with the lower end of said chamber for controlling discharge of the batter, control means for (a) substantially simultaneously operating said pump, opening said inlet valve, closing said discharge valve and applying vacuum to the chamber so that entrained air is removed from the batter as it flows into the chamber from said conduit and subsequently (b) turning off said pump, closing said inlet valve, opening said discharge valve and applying air pressure to said chamber for discharge of the contents of the chamber and means for cycling said control means so that the pressure-vacuum cycle is repeated successively.

6. In a vacuum-pressure apparatus for handling batter in a sausage stuffing machine or the like, the combination comprising an enclosed vacuum treating chamber having an inlet conduit at its upper end connected to a source of pressurized batter, an inlet valve interposed in said conduit for controlling admission of batter, a discharge valve associated with the lower end of said chamber for controlling discharge of the batter, an air line connected to the upper end of the chamber, a vacuum-pressure applying means connected to the airline, and a control means associated with said valves and with said vacuum and pressure applying means for (a) opening said inlet valve, closing said discharge valve and applying vacuum so that entrained air is removed from the batter as it flows from said conduit and accumulates at the bottom of said chamber and for (b) substantially simultaneously closing said inlet valve, opening said discharge valve and applying pressure so that the accumulated batter is discharged, said control means including means for producing successive vacuum and pressure cycles.

7. In a vacuum-pressure apparatus for transporting and deareating batter or the like, the combination comprising an enclosed vacuum-pressure chamber having a conduit at its upper end connected to a source of pressurized batter, an inlet valve interposed in said conduit, a discharge valve associated with the lower end of the chamber, a source of vacuum, a source of air pressure, valve means for coupling said sources to said chamber, means for operating said valve means to apply a vacuum to said chamber, means for causing delayed opening of said inlet valve so that a stream of batter flows into said chamber after a vacuum has been built up and so that entrained air is removed from said batter as it flows from said conduit and accumulates at the bottom of said chamber, and means for operating said valve means so that air pressure is applied within said chamber and for substantially simultaneously opening said discharge valve for discharge of the accumulated batter from the chamber.

8. In a vacuum-pressure apparatus for handling batter in a sausage stuffing machine or the like, the combination comprising an enclosed vacuum treating chamber having an inlet conduit at its upper end for supplying batter under pressure, an enclosed receptacle below said chamber having an outlet at its lower end terminating in a discharge nozzle, a check valve interposed between the chamber and the receptacle, means for pulling a vacuum in the chamber during admission of the batter so that the check valve is drawn closed and so that entrained air is removed from the batter as it flows into the chamber from said conduit, means for thereafter applying air pressure to the chamber for opening the check valve when the chamber has received a charge of batter from said source for pressure discharge of the deareated batter into the receptacle, means for cycling the vacuum applying and pressure applying means, and means for maintaining air pressure in said receptacle so that when the check valve closes during the subsequent vacuum portion of the cycle, the batter continues to flow from said receptacle to said nozzle.

References Cited in the file of this patent

UNITED STATES PATENTS

| | | |
|---|---|---|
| 2,721,678 | Gill | Oct. 25, 1955 |
| 3,034,171 | Rosenthaler | May 15, 1962 |
| 3,081,484 | Schnell | Mar. 19, 1963 |
| 3,090,593 | Pro | May 21, 1963 |

FOREIGN PATENTS

| | | |
|---|---|---|
| 664,769 | Canada | July 17, 1962 |